Jan. 8, 1924.

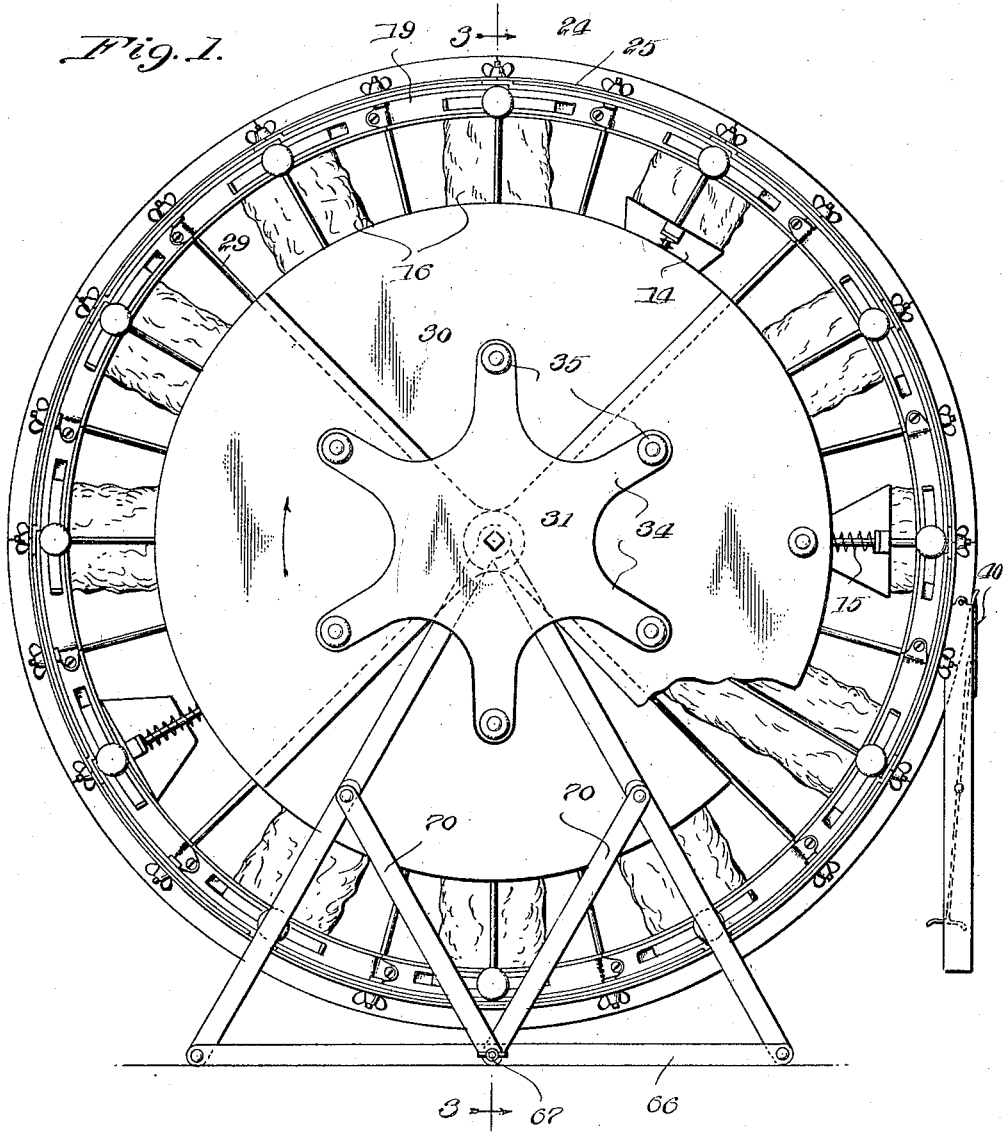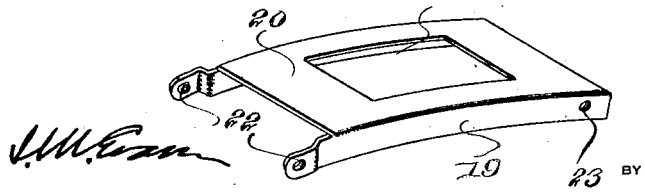

C. D. DYE

SLICING MACHINE

Filed Jan. 22, 1923

C. D. Dye
INVENTOR

BY Victor J. Evans
ATTORNEY

WITNESS:

Jan. 8, 1924.  1,480,051
C. D. DYE
SLICING MACHINE
Filed Jan. 22, 1923   5 Sheets-Sheet 3

C. D. Dye
INVENTOR
BY Victor J. Evans
ATTORNEY

WITNESS:

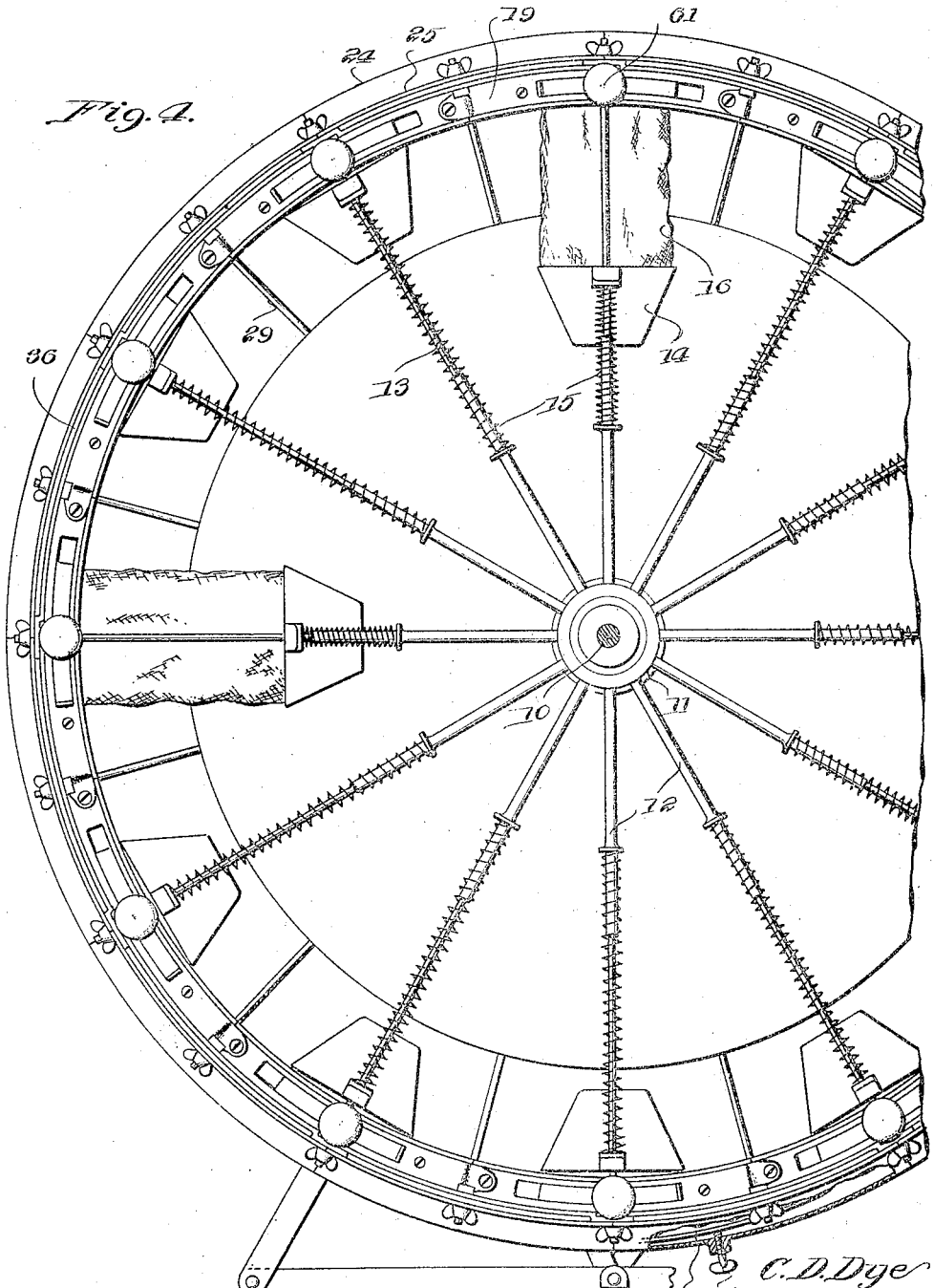

Jan. 8, 1924.                                       1,480,051
                    C. D. DYE
                  SLICING MACHINE
              Filed Jan. 22, 1923        5 Sheets-Sheet 5
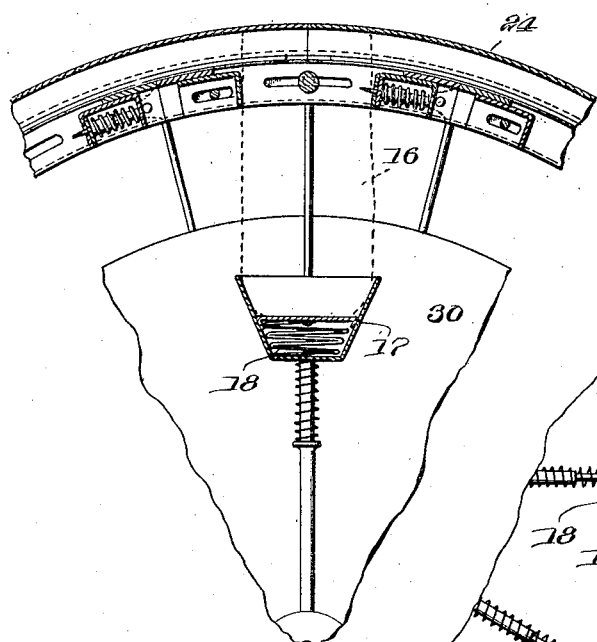
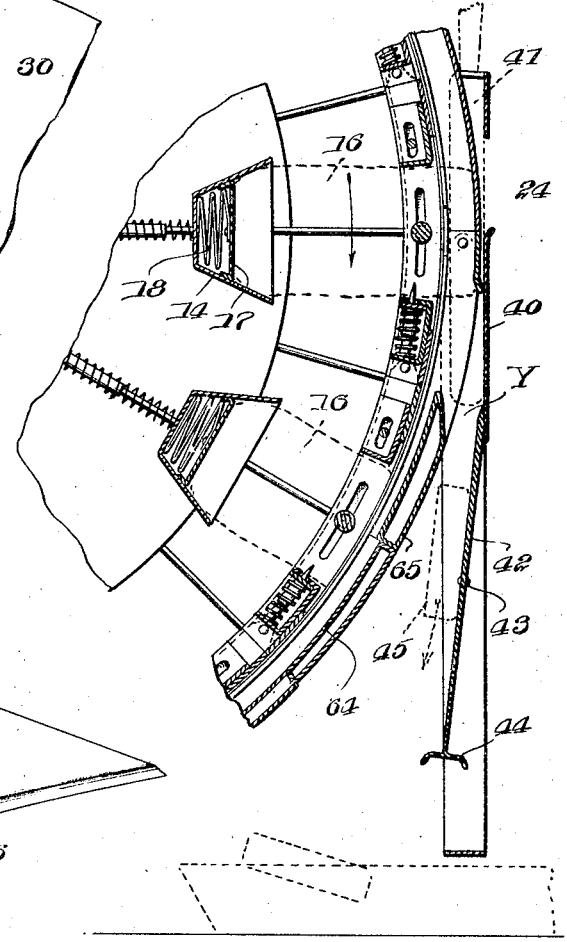
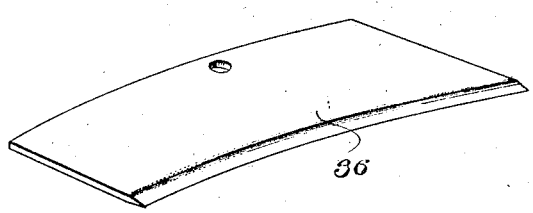

Patented Jan. 8, 1924.

1,480,051

UNITED STATES PATENT OFFICE.

CARL DEWITT DYE, OF DETROIT, MICHIGAN.

SLICING MACHINE.

Application filed January 22, 1923. Serial No. 614,300.

*To all whom it may concern:*

Be it known that I, CARL D. DYE, a citizen of the United States, residing at Detroit, in the county of Wayne and State of Michigan, have invented new and useful Improvements in Slicing Machines, of which the following is a specification.

This invention contemplates the provision of a bread slicing apparatus, possessing a configuration similar to that of a wheel, capable of being rotated for the purpose stated and collapsed to materially reduce the size of the apparatus when not in use.

One of the chief characteristics of the invention resides in providing the apparatus with a plurality of loaf holders arranged to rotate within the fixed annular rim of the wheel, and designed to support the loaves in a manner whereby they pass between a series of knife blades for the purpose of slicing each loaf.

An important object of the invention resides in providing each loaf holder with means for holding the loaf of bread immovably positioned therein, so that any one or number of loaves of the same kind or different kinds of bread may be sliced as desired, while the other loaves are held stationary within their holders.

Another very important object of the invention resides in a novel construction of means susceptible of adjustment for the purpose of regulating the thickness of the slice severed.

In carrying out the invention I further provide means for supporting an ordinary knife adjacent the outlet end of the apparatus, the knife being disposed to cut each slice in half, just prior to the slice being discharged from the apparatus.

A further object of the invention resides in the provision of means actuated by the slices of bread as they leave the apparatus, for piling or stacking the bread upon a plate with the wheat bread separated from the rye or Graham bread or the like.

The nature and advantages of the invention will be readily understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the apparatus set up for use.

Figure 4 is a sectional view taken on the line 4—4 of Figure 3.

Figure 6 is a fragmentary view in section showing the manner in which the loaf is gripped and held immovable with relation to the holder.

Figure 7 is a fragmentary view in section showing the manner in which the slice is cut in half just prior to its discharge from the apparatus.

Figure 8 is a detail view of one of the blades.

Figure 10 is a detail view of one of the loaf guides.

Figures 3, 9:
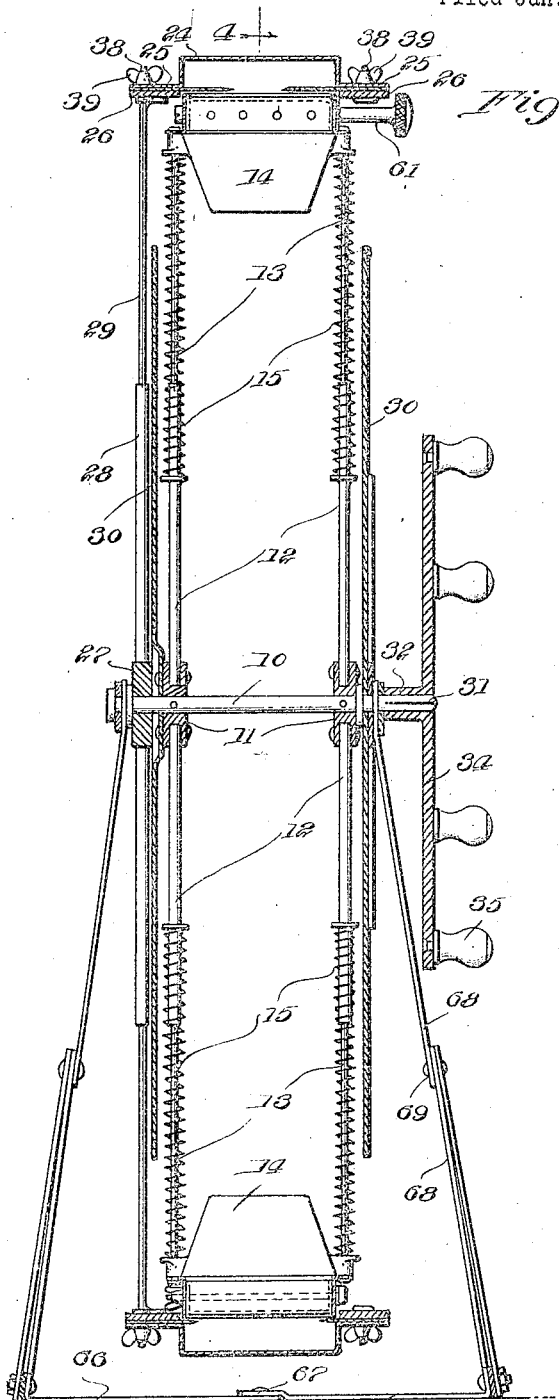
Figure 3 is a sectional view taken on the line 3—3 of Figure 1, looking in the direction of the arrows.
Figure 9 is a view showing the arrangement of the blades.

The apparatus forming the subject matter of the present invention is designed to possess a general configuration or outline similar to a wheel, and embodies a shaft 10, the latter supporting spaced hubs 11. Radiating from each hub is a plurality of spokes, each including a fixed section 12 associated with said hub and a telescopic section 13. The spokes of the respective hubs are used in pairs as clearly illustrated in Figure 3, and the corresponding telescopic section 13 of each pair of spokes yieldably supports a loaf holder indicated at 14. For this purpose use is made of coil springs 15 there being one spring for each spoke, with one end of said spring attached to the fixed section 12 and another section attached to the telescopic section 13. Consequently the loaf holder can be moved inwardly to receive a loaf of bread as illustrated in Figure 4, the bread being indicated at 16. Each holder 14 consists of a shallow receptacle in the bottom of which is arranged a spring pressed follower 17, the spring of which is indicated at 18, Arranged above each loaf holder 14 is what I term a guide, which both guides and centers the loaf with respect to the holder, the guide being associated with the holder for rotation therewith. Each of these guides is of substantially inverted U-shape in formation in cross section and indicated at 19, the top 20 of which is provided with an opening 21 through which the loaf passes step by step under the influence of the springs 15 and 18 respectively, above described. These guides are arranged in end to end relation apertured ears 22 projecting from one end of each guide to overlap the adjacent end of the next guide, the apertures of said ears registering with openings 23 to receive suitable fastening elements which hold the said guides associated.

Arranged above these guides is a stationary member 24 which is also of U-shaped formation in cross section, terminating at the sides to provide lateral flanges 25 which are secured to continuous strips 26. These strips are supported by spokes radiating from hubs 27 which are loosely fixed upon the shaft 10, to permit rotation of the shaft independently of these hubs. The spokes just referred to are made up of a fixed section 28 and a telescopic section 29, which allows the apparatus in its entirety to be collapsed or folded in the manner shown in Figure 2 when not in use. The telescopic section 29 of each spoke passes through the strips 26 and the adjacent flanges 25 of the member 24, and form what may be termed the rim of the wheel, beneath which the loaf holders and guides rotate. Disk like members 30 are carried by the shaft 10 and cover the major portions of the spokes which yieldably support the bread holders 14. The shaft is squared on one end as at 31 to receive the hub 32 from which projects arms 34 each of which supports a knob 35. Any of the knobs or arms can be taken hold of for the purpose of rotating the shaft and its associated parts.

Arranged between the strip 26 and the lateral flanges 25 of the member 24 is a plurality of cutting blades, these blades being arranged in pairs, with the respective pairs arranged in end to end relation. The arrangement of the blades is more clearly illustrated in Figure 9, wherein it will be noted that each pair of blades indicated at 36 gradually and successively increase in width from one end of the series of blades to the other end thereof, thus producing a tapered or converging passage 37 through which the loaf of bread passes while the slice is being severed. Each blade is slightly spaced apart by fastening elements 38 which are utilized to hold the strips 26 and the flanges 25 of the members together, each fastening element being equipped with a thumb nut 39. It will be noted upon inspection of Figure 3, that these blades are disposed immediately above the guides 19, and overlie the opening 21 of said guides. It is manifest from the construction thus far described, that as each loaf of bread is projected from its holder through the opening of the guide 19, the said loaf is brought into contact with the member 24 which of course limits the movement of the loaf in one direction under the influence of the spring 18. As the shaft 10 is rotated, the loaves 16 are in successive order brought to a position where they pass between the blades 36. As they continue through the passage 37, a slice is severed from each loaf, this operation being completed just before the slice is brought to a position from which it is discharged from the apparatus.

The slice is discharged at the point Y in Figure 7, wherein it will be noted that the member 24 is provided with an opening which communicates with a holder 40 designed to accommodate an ordinary table knife indicated at 41. This knife 41 is arranged edgewise, or in other words at a right angle to the slice severed from the adjacent loaf. The relation of the knife 41 to the severed slice is such, that just before the slice is discharged through the opening in the member 24 it is cut into halves by the knife 41. These halves of each slice passing through the holder and are adapted to be deposited on a plate or other suitable support arranged beneath the pivoted member 42. This member 42 is pivoted at a point in its length as at 43 and supports a shoe 44 at the lower end thereof, which is adapted to be contacted by the slices indicated at 45 to deflect the latter in one direction or the other so that slices of certain kinds of bread are stacked one upon the other as will be readily understood. In other words the upper part of this member 42 is weighted to remain in either of its adjusted positions given by the slices coming in contact with the shoe 44. As for instance every alternate loaf of bread is rye bread, as the slices are severed they would contact one side of the shoe 44 to be deflected on one side of the plate or support to receive the bread, and incidentally swinging the member 42 to the opposite side of the knife 41, so that the next slice severed from the loaf of wheat bread passes down the other side of the member 42, striking the adjacent side of the shoe 44, is thereby deflected toward the other side of the plate. Consequently, the slice discharged from the apparatus reverses the position of the member 42.

As above stated, the apparatus may include any number of loaf holders 14, but that only one loaf or any number of loaves may be sliced incident to the turning of the apparatus, and independently of any other loaves which the apparatus may contain.

For this purpose I provide means within each guide member 19, designed to grip the loaf contained in the adjacent holder in a manner to prevent this loaf from being fed through the guide. While this means may vary in construction, it preferably consists of spaced cup shaped members indicated at 46 and 47 respectively, the former being provided with aligned slots 48 to permit the lateral adjustment of said member 46 so that the members may be utilized in connection with a loaf of bread of any particular size or shape. The member 46 is held in position by means of a fastening element 49 equipped with a thumb nut 50, the element 49 passing through the slots above referred to. The member 46 is provided with a threaded element 51 having associated therewith a thumb nut 52 which when tightened holds the member 47 in any desired position. This member however, is provided with a plurality of openings 53 through which projects prongs 54 carried by a transverse portion 55 of a substantially L-shaped member, the remaining portion of which, indicated at 56, terminating to provide a finger engaging portion 57. This member has its transverse portion 55 operating in the cup shaped member 47, and formed with a hollow tubular member 58, which receives a stem 59 projecting from the rear wall of the member 47. Surrounding the stem and the tubular member is a spring 60 which exerts a pressure against the transverse portion 55 of the prong carrying member, thereby holding the prongs projected to engage the adjacent loaf of bread. Associated with the portion 56 of this prong carrying member is a fastening element 61, which when loosened permits the prongs 54 to be moved within the cup shaped member 47, and held in this position by tightening the element 61. This procedure is followed when it is desired to slice any particular loaf, which of course must be free to feed through the opening 21 of the guide 19. It is therefore obvious, that the means just described can not only be adjusted to accommodate itself to different sizes and shapes of loaves of bread with a view of holding a loaf immovable within the holder 14, but that the prong carrying member can be independently adjusted to separate itself from the loaf, and held in this position to permit the loaf to pass freely through the holder 19 step by step as the slices are severed therefrom. Consequently if the machine is loaded with a certain number of wheat loaves, rye loaves, Graham loaves or the like, any of these loaves can be severed into slices independently of the other loaves by simply adjusting the means above described to hold the latter mentioned loaves immovable with relation to their holders, and to prevent freedom of movement of such loaves as is desired to be cut.

The invention contemplates a novel means for varying or regulating the thickness of the slices so severed, and this means is controlled by a single adjusting screw or element 63 illustrated in Figure 4. This adjusting element influences the leaf spring 64 which is fixed at one end to a wall or partition 65 arranged within the rim 24 immediately adjacent the outlet opening of said member as clearly shown in Figure 7. As the severed slices of any particular loaf pass from the rim at a point Y in Figure 7, the remaining portion of the loaf is of course forced against the partition or wall 65 which holds the loaf in a depressed position until it passes from this wall or partition onto the spring 64. By adjusting the spring 64 through the instrumentality of the element 63, toward and away from the guide member 19, the space between the guide member and said spring is varied, and it is the dimensions of this space that regulates or controls the thickness of the slices. After the loaf has passed from the wall or partition 65 into engagement with the spring 64 it remains in engagement with this spring until it enters the passage or space 37 between the knives 36. As soon as the loaf passes from the spring into the space 37 just mentioned it is engaged by the knives which hold the loaf against any further outward movement under the influence of the spring 18. So that a slice of a particular thickness is severed, the loaf not being allowed to contact the wall of the rim 24.

Figure 2:
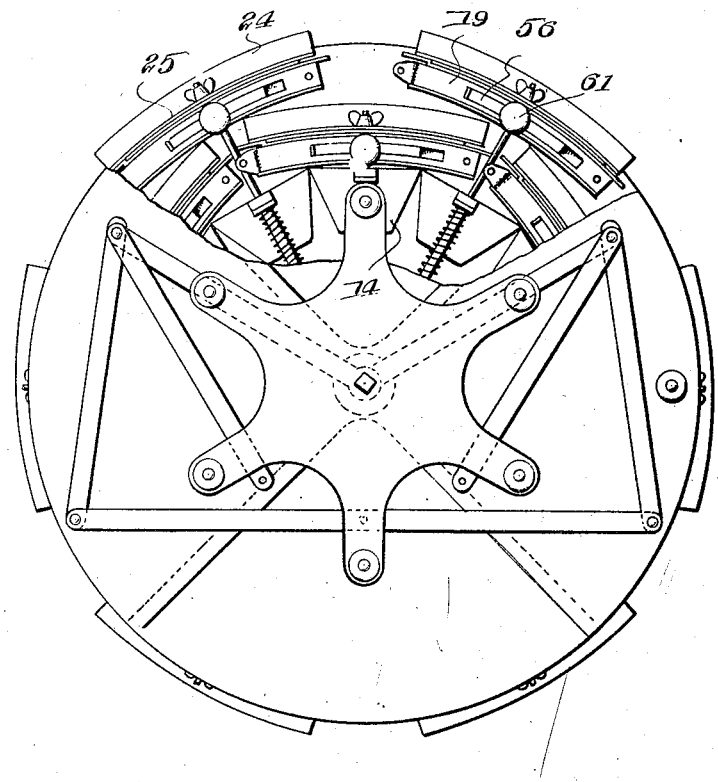
Figure 2 is a similar view partly in section showing the apparatus collapsed.
Figure 5:
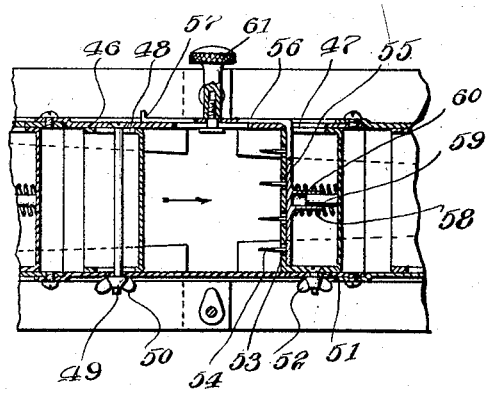
Figure 5 is a horizontal sectional view through one of the loaf holders and its cooperating parts.

The apparatus in its entirety is mounted upon a supporting structure which includes a base made up of pivotally connected sections 66, the latter being pivoted as at 67, and terminally associated with an inverted V-shaped support. There is one of these V-shaped portions for both sides of the apparatus as clearly illustrated in Figure 3, the limbs of each support being made up of sections 68 which are pivotally connected together as at 69, these pivots also pivotally associating the adjacent ends of the bracing elements 70 with said support. The bracing elements 70 in themselves are convergently disposed and have their adjacent lower extremities connected together by the pivot 67 of the base sections 66. This allows the supporting structure to be folded to lie within the diameter of the apparatus at either side thereof when the latter is collapsed, it being only necessary to separate the bracing elements 70 from the base sections 66, which allows the latter to be moved upwardly as the sides of the V-shaped support break at their points of pivotal connection indicated at 69. It is of course understood that these supports are pivotally associated with the shaft 10 to permit the supporting structure in its entirety, at either side of the apparatus to assume the folded position clearly shown in Figure 2. The apparatus itself may be readily collapsed by separating the guides 19, which as above stated are arranged in end to end relation and suitably connected together. Subsequent to this separation of the parts, the telescopic sections 13 of certain pairs of spokes are depressed against the tension of their associated springs 15, thereby moving the loaf holders, supported by the particular spokes, together with their guides and sectional rim portions inwardly and beneath the adjacent loaf holders as shown in Figure 2. This permits the apparatus to be materially reduced in size as illustrated.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A bread slicing machine comprising a stationary annular rim, a plurality of loaf holders arranged in a circular series and mounted for rotation inwardly of said rim, a guide for each loaf, means for projecting each loaf within the rim, means for slicing each loaf in successive order as said loaves are rotated, said rim having an outlet opening through which the severed slices pass, and means for cutting each slice in halves just prior to its passage through said opening.

2. A bread slicing machine comprising a stationary annular rim, a plurality of loaf holders arranged in a circular series and mounted for rotation inwardly of the rim, yieldable means supporting each holder, means for projecting said loaves within the rim, means for slicing said loaves in successive order as the latter are rotated, and means arranged in each holder for holding said loaf immovable, whereby any one or combination of loaves may be sliced at the will of the operator.

3. A bread slicing machine comprising a stationary annular rim, a shaft, spokes radiating from the shaft and supporting said rim, a plurality of loaf holders arranged in a circular series, additional spokes radiating from said shaft and yieldably supporting said holders, means within each holder for projecting the loaf thereof within the rim, and means for slicing said loaves in successive order as the latter are rotated.

4. A bread slicing machine comprising a stationary annular rim, a plurality of loaf holders arranged in a circular series and mounted for rotation, means for projecting each loaf within the rim, a guide associated with each holder and having an opening through which the loaf thereof projects into said rim, means associated with said guide for holding the loaf immovable with relation to its holder, and means for slicing such loaves as project within the rim, incident to the rotation of the holders.

5. A bread slicing machine comprising a stationary annular rim made up of sections arranged in end to end relation, a shaft, telescopic spokes radiating from said shaft and supporting the sections of said rim, a plurality of bread holders arranged in a circular series, additional telescopic spokes yieldably supporting the bread holders, whereby said spokes may be collapsed to reduce the size of the machine when not in use, means associated with each holder for projecting the loaf thereof within said rim, a guide carried by each holder and having an opening through which the loaf passes into the rim, and means for slicing said loaves in successive order as the holders are rotated.

6. A bread slicing machine comprising a stationary annular rim, a shaft, a plurality of loaf holders supported by the shaft for rotation and arranged in a circular series inwardly of said rim, a guide associated with each holder and having an opening through which the loaf passes, means for projecting the loaves within the rim, means for slicing the loaves in successive order as the latter are rotated, and adjustable means associated with said rim for regulating the thickness of the slices so severed.

7. A bread cutting machine comprising an annular rim, a shaft, a plurality of loaf holders supported by the shaft for rotation, and arranged in a circular series, means for projecting each loaf within the rim, means for slicing the loaves in successive order as they pass a particular part of the rim, said rim having an outlet opening through which the slices pass, a partition arranged within the rim at one side of said opening, and a curved element susceptible of adjustment and arranged to form a continuation of said partition, and to adjust the thickness of the slices next severed.

8. A bread cutting machine comprising a stationary rim, a shaft, a plurality of bread holders supported by the shaft, for rotation therewith, and arranged in a circular series, of means for projecting the loaves from said holders within the rim, means for slicing said loaves in successive order as the latter are rotated, said rim having an outlet for said slices, means arranged adjacent said opening for cutting each slice in halves, and a pivoted member disposed adjacent said opening, a shoe carried by the lower end of said member and adapted to be engaged by the slice delivered from the machine to alternately reverse the position of said member for the purpose specified.

9. A bread slicing machine comprising a stationary rim, made up of a plurality of sections arranged end to end, a shaft, a plurality of bread holders supported by said shaft and rotated therewith and arranged in a circular series, a guide associated with each holder, means for connecting the adjacent ends of said guides together, yieldable means for projecting each loaf from the holder through the guide into said rim, said rim and holders being adapted to be collapsed to reduce the size of the machine when not in use, means for severing the loaves as they pass through the rim, a supporting structure for the machine, and said structure including a plurality of pivotally connected sections and adapted to be folded or collapsed to lie within the confines of the sides of the machine when not in use.

10. A bread cutting machine comprising a stationary annular rim, a shaft, means for rotating the shaft, a plurality of loaf holders supported by the shaft for rotation therewith and arranged in a circular series, means in each holder for projecting the loaf therefrom to said rim, a guide associated with each holder and through which said loaf passes, a plurality of cutting blades arranged in pairs and in end to end relation, the blades of said pairs being successively increased in size to provide a convergently disposed passage between said blades and through which the loaves pass thereby slicing in successive order, and means susceptible of adjustment to vary the thickness of the slices so severed.

In testimony whereof I affix my signature.

CARL DEWITT DYE.